United States Patent
Zhang et al.

(10) Patent No.: US 10,613,548 B2
(45) Date of Patent: Apr. 7, 2020

(54) ARCHITECTURE FOR SECURE VEHICLE CONTROL

(71) Applicant: Zoox, Inc., Menlo Park, CA (US)

(72) Inventors: Yanxin Zhang, San Ramon, CA (US); John David Castillo, Danville, CA (US)

(73) Assignee: Zoox, Inc., Foster City, CA (US)

( * ) Notice: Subject to any disclaimer, the term of this patent is extended or adjusted under 35 U.S.C. 154(b) by 247 days.

(21) Appl. No.: 15/788,415

(22) Filed: Oct. 19, 2017

(65) Prior Publication Data

US 2019/0121357 A1 Apr. 25, 2019

(51) Int. Cl.
| | | |
|---|---|---|
| *G05D 1/02* | (2020.01) | |
| *G05D 1/00* | (2006.01) | |
| *H04L 29/08* | (2006.01) | |
| *H04W 4/44* | (2018.01) | |
| *H04W 4/46* | (2018.01) | |

(52) U.S. Cl.
CPC ......... *G05D 1/0276* (2013.01); *G05D 1/0027* (2013.01); *G05D 1/0088* (2013.01); *G05D 1/0285* (2013.01); *H04L 67/12* (2013.01); *H04W 4/44* (2018.02); *H04W 4/46* (2018.02); *H04L 67/10* (2013.01)

(58) Field of Classification Search
CPC .. G05D 1/0276; G05D 1/0285; G05D 1/0088; G05D 1/0027; H04W 4/44; H04W 4/46; H04L 67/12; H04L 67/10
See application file for complete search history.

(56) References Cited

U.S. PATENT DOCUMENTS

| | | | | |
|---|---|---|---|---|
| 8,560,609 | B2 * | 10/2013 | Nathanson | H04L 67/12 709/204 |
| 8,996,224 | B1 * | 3/2015 | Herbach et al. | G05D 1/0027 701/23 |
| 9,466,219 | B1 * | 10/2016 | Stefani et al. | G05D 1/0027 |
| 2014/0136414 | A1 | 5/2014 | Abhyanker | |
| 2015/0248131 | A1 * | 9/2015 | Fairfild et al. | G05D 1/0027 701/2 |
| 2015/0331422 | A1 * | 11/2015 | Hartung et al. | G05D 1/021 701/23 |
| 2017/0126810 | A1 | 5/2017 | Kentley et al. | |
| 2017/0261990 | A1 * | 9/2017 | Lei et al. | G05D 1/0214 |
| 2017/0305434 | A1 * | 10/2017 | Ratnasingann | G05D 1/0088 |
| 2017/0305437 | A1 * | 10/2017 | Onorato et al. | H04L 67/10 |
| 2017/0349027 | A1 * | 12/2017 | Goldman-Shenhar et al. | B60H 1/00742 |
| 2017/0352200 | A1 * | 12/2017 | Wang et al. | G05D 1/021 |
| 2018/0178741 | A1 * | 6/2018 | Poeppel et al. | G05D 1/0088 |
| 2018/0251126 | A1 * | 9/2018 | Linscott et al. | G05D 1/0088 |
| 2019/0101923 | A1 * | 4/2019 | Sun et al. | G05D 1/0088 |

OTHER PUBLICATIONS

PCT Search Report and Written Opinion dated Jan. 31, 2019 for PCT Application No. PCT/US2018/056346, 8 pages.

* cited by examiner

*Primary Examiner* — Dale W Hilgendorf
(74) *Attorney, Agent, or Firm* — Lee & Hayes, P.C.

(57) ABSTRACT

An architecture for receiving and responding to requests in a vehicle system may include transmitting requests to a remote processing system configured to verify the authenticity of requests and determine responsive actions. The action jobs may be maintained at a location remote from the vehicle, and the vehicle may be configured to retrieve action jobs from the remote location.

20 Claims, 6 Drawing Sheets

ARCHITECTURE FOR SECURE VEHICLE CONTROL

BACKGROUND

Many of today's vehicles are becoming increasingly connected. In some vehicles, everything from systems for control of the car (e.g. ignition, steering, etc.) to user comfort settings (e.g. sound systems, lighting systems, window adjustment, and the like) may be controlled remotely via a network connection, or otherwise provide a connection to a network. These network connections may be susceptible to third party attacks, putting passengers at risk of an attacker's nefarious intent.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
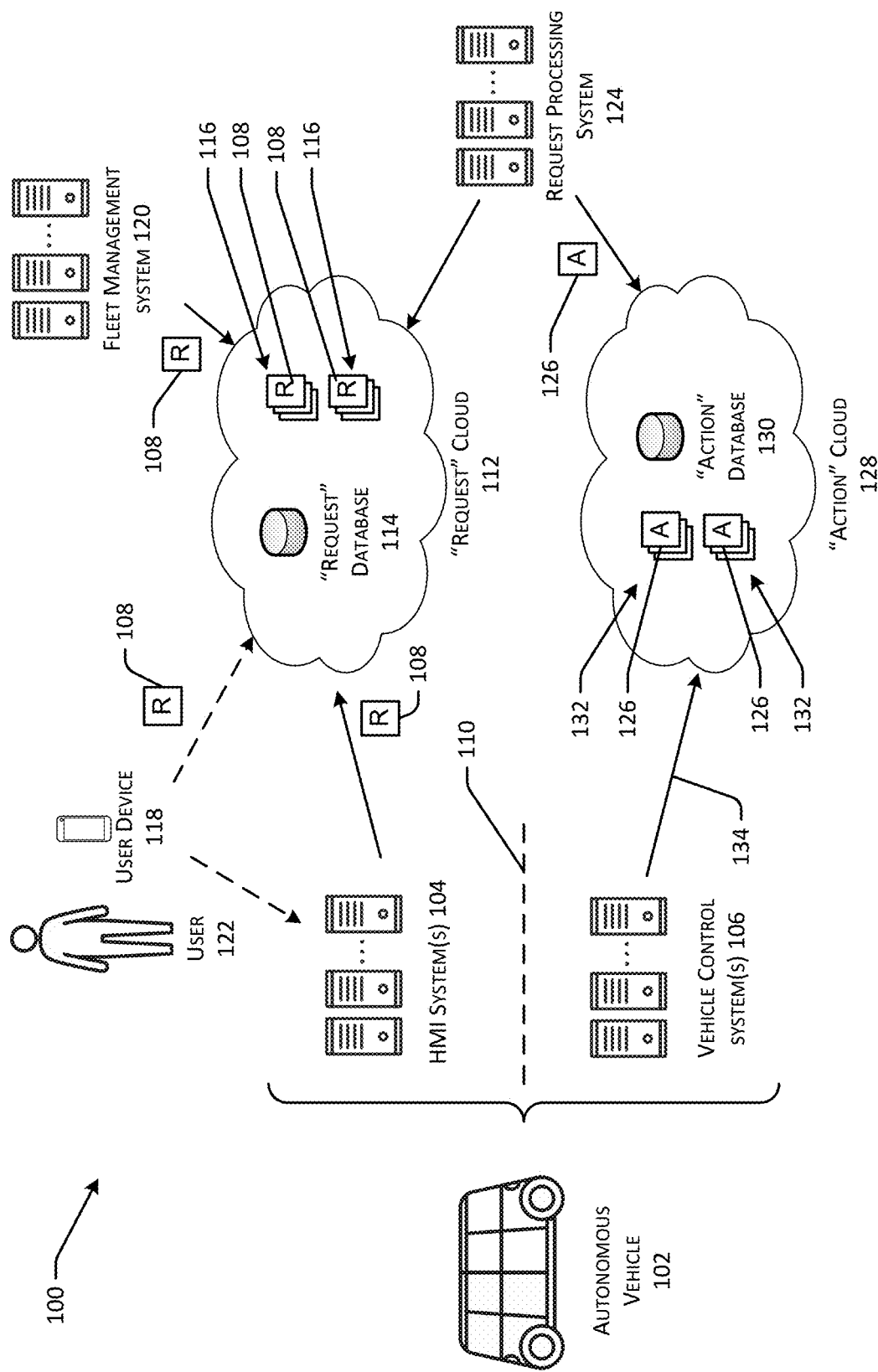
FIG. 1 is a schematic representation of an architecture for receiving requests associated with a vehicle, such as an autonomous vehicle, and implementing actions in response to the requests.

Example vehicles, such as example autonomous vehicles, may provide many opportunities for users to specify setting and otherwise control features. For example, drivers and passengers in conventional automobiles are accustomed to having control of audio settings, air condition settings, and/or comfort settings. Conventionally, such settings may be controlled by user manipulation of some user interface, e.g., a button, switch, or other user interface element disposed in the vehicle. Remote vehicle control interfaces have also increasingly become available. For example, keyless entry, keyless ignitions and app-based user interfaces have further expanded the type and number of interfaces with which drivers and passengers can interact with vehicles. Furthermore, in addition to drivers and passengers interfacing with the vehicle, third parties also may access systems associated with the vehicle. For example, service technicians regularly access on-board computing systems, e.g., to update software and firmware, for diagnostic purposes, and the like. As vehicles become further automated, it is reasonable to expect that additional and alternative interfaces and/or types of controls facilitated through user interface will expand. By way of non-limiting examples, in some semi- or fully-autonomous vehicles, the passenger may control a destination of the vehicle and/or other characteristics of the autonomous vehicle that have historically been under manual control of the driver.

In conventional vehicle systems such as those just described, the many access points to the vehicle may be used to allow access to the vehicle, for example, to provide instructions to the vehicle, to change settings in the vehicle, and/or to otherwise control one or more aspects of the vehicle. Thus, signals received via the many interfaces are relayed to control units in the vehicle, to carry out some action. In a simple example, a central control unit may be configured to receive an electrical signal in response to a user indication, e.g., via input to a user interface, that the user would like to reduce the temperature in the vehicle. Upon receipt of this control signal, the control unit may cause the air conditioning unit to turn on.

In addition to control units that are activated in response to user inputs, vehicles are increasingly including control functionality to perform actions responsive to sensed conditions, i.e., without user input. For instance, control units may be used to control braking, such as in assisted-braking scenarios, and/or to control steering, such as in some collision avoidance systems. Thus, conventional vehicle architectures are generally configured to allow for a number of inputs from a number of different sources, and are connected to an increasing number of components within the vehicle.

The conventional architecture just described, i.e., in which a growing number of access points to a vehicle is interconnected with control units configured to control an increasing number of functionalities, generally allows for a simplified system with broad flexibility. However, a practical result is that access to the system, e.g., via a human-machine interface, may expose conventional vehicles to allowing unintentional access to all aspects of the vehicle. More specifically, conventional architectures may allow would-be hackers to land on a purposefully public interface, e.g., an application on a personal device that allows for starting, unlocking, or other remote control of a vehicle, and gain access to critical functionality associated with the car, via the connected interfaces of the vehicle. For example, attacks on the conventional system could allow a hacker to gain remote control of one or more functions of a vehicle (e.g. steering, braking, ignition, etc).

Implementations of this disclosure provide an improved architecture, methods and systems for preventing attacks such as those just described.

In some implementations of this disclosure, a segmented architecture is described that may reduce surface area available for attacks by removing connections between systems that receive requests at the vehicle and systems that control functionality associated with the vehicle. For instance, implementations of this disclosure include a human-machine interface that receives requests and a separate vehicle control system that implements actions to carry out responses to those requests.

In some implementations, requests received at a human-machine interface associated with the vehicle, e.g., interfaces in the vehicle or interfaces associated with the vehicle in some manner, may be uploaded or otherwise stored to a computing environment remote from the vehicle. In implementations of this disclosure, the remote computing environment may be configured to receive requests from vehicles, from applications associated with the vehicle, e.g., applications running on a personal electronic device, and/or from some other third party, e.g., a service technician or an entity configured to coordinate travel or other functionality of the vehicle. The remote computing environment may be configured to process the requests, e.g., to prioritize the requests in one or more queues and/or to verify authenticity of the requests. In some implementations, the remote computing environment may be embodied as one or more private cloud computing environments.

Implementations of this disclosure may also include a request processing system that further processes the requests. For instance, the request processing system may also or additionally confirm the authenticity of requests, and may also determine actions that the vehicle may perform in response to the request. For example, when a request is to increase the temperature inside the vehicle, the request processing system may determine an appropriate action involves implementing changes to the HVAC system and/or seat heaters associated with the requester. The request processing system may also cause these determined actions to be stored in a second database, which may be a second private cloud computing environment. In some implementations, actions determined by the request processing system may be queued at the second database.

According to some implementations of this disclosure, the stored actions may then be accessed by the vehicle. For example, a control system of the vehicle may query the action database to determine whether any action jobs exist for the vehicle. If one or more actions are pending for the vehicle, the vehicle may implement the action(s), e.g., by adjusting one or more components of the vehicle. In the example of the request to change the temperature in the vehicle, the vehicle may control the HVAC system and/or one or more seat heaters to increase the temperature in the vehicle.

Aspects of this disclosure may provide increased security over conventional request and control architectures. For instance, authenticating requests to change attributes associated with the vehicle may identify and thwart nefarious attempts to gain access to control units associated with the vehicle. Moreover, because in implementations of this disclosure the vehicle retrieves action jobs, instead of receiving action commands, the control systems may be less prone to unauthorized access. Moreover, the proposed architecture may be implemented for a plurality of vehicles, such that requests application to more than one vehicle may be effectively conveyed.

The architecture, techniques, and systems described herein may be implemented in a number of ways. Example implementations are provided below with reference to the following figures.

FIG. 1 is a schematic illustration of an architecture 100 according to implementations of this disclosure. In examples described herein, the architecture 100 is associated with one or more autonomous vehicles, such as the autonomous vehicle 102. Although only a single autonomous vehicle 102 is illustrated in FIG. 1, it will be appreciated that additional autonomous vehicles may also be included in the architecture. For the purpose of illustration, the vehicle 102 is illustrated as a fully-autonomous, driverless vehicle, such as an autonomous vehicle configured to operate according to a Level 5 classification issued by the U.S. National Highway Traffic Safety Administration. This classification describes a vehicle capable of performing all safety-critical functions for the entire trip, with passengers in the vehicle not being expected to control the vehicle at any time. In such examples, because the vehicle 102 may be configured to control all functions from start to completion of the trip, including all parking functions, it may not include a driver. This is merely an example, and the systems and methods described herein may be incorporated into any ground-borne, airborne, or waterborne vehicle, including those ranging from vehicles that need to be manually controlled by a driver at all times, to those that are partially- or fully-autonomously controlled.

As illustrated, the example vehicle 102 may include a human machine interface (HMI) system 104 and one or more vehicle control systems 106. The HMI system 104 is generally configured to receive inputs, such as user inputs, comprising requests to the autonomous vehicle 102. In some examples, the request may come via one or more user interface elements disposed in the autonomous vehicle 102, including, but not limited to, buttons, switches, touch screens, or audio interfaces. By way of non-limiting example, the HMI system 104 may receive requests from a passenger to turn a light on or off, to increase or decrease the temperature in the autonomous vehicle 102, to control opening or closing of a window of the autonomous vehicle 102, to re-route the autonomous vehicle 102 to a new destination, and/or to adjust aspects of an audio and/or visual system in the autonomous vehicle 102, for example. The HMI system 104 may also be configured to output requests 108, e.g., to a remote computing environment, as will be described in more detail below. Additional aspects of the HMI system 104 are described below in connection with FIG. 2.

The vehicle control system(s) 106 generally are configured to implement actions at the autonomous vehicle 102. By way of non-limiting example, the vehicle control system(s) 106 may be configured to control one or more lights in the autonomous vehicle 102, to control one or more aspects of a heating, ventilation, and air conditioning (HVAC) system of the autonomous vehicle 102, to control the opening and closing of windows in the autonomous vehicle 102, to control aspects of audio and/or video systems in the autonomous vehicle 102, and/or to control maneuvering, acceleration and/or braking of the autonomous vehicle, for example. Additional aspects of the vehicle control systems 106 are described below in connection with FIG. 4.

In implementations of this disclosure, components associated with the HMI system(s) 104 and components associated with the one or more vehicle control systems 106 are disposed on or in the autonomous vehicle 102. However, as illustrated by dotted line 110, the HMI system 104 and the vehicle control system 106 may be embodied as separate, unconnected systems of the autonomous vehicle 102. As used in this disclosure, the systems are separate in that they are not configured for direct communication with each other. For example, in response to receiving a request to change an attribute of the autonomous vehicle 102, the HMI system(s) 104 do not directly signal the vehicle control system(s) 106 to take some action to respond to the request. As described above, this may be different from conventional systems, in which the HMI system(s) 104 are directly connected, e.g., via a CAN or the like, to vehicle control system(s) 106. However, in some implementations of this disclosure, the HMI system(s) 104 may be serially linked to one or more features of the autonomous vehicle 102. For example, the HMI system(s) 104 may be linked directly to lights, such that operation of a control to turn on a light is directly linked to the light.

In implementations of this disclosure, instead of directly relaying a request 108 to vehicle control systems 106, the HMI system 104 may be configured to send all requests 108 to a remote computing environment. In FIG. 1, this remote computing environment is embodied as a request cloud 112. More specifically, in this example, the remote computing environment may include a cloud computing environment such as a private cloud computing environment. The request cloud 112 may include a request database 114 configured to store the requests 108 received from the HMI system 104. Additionally or alternatively, as also illustrated in FIG. 1, the request cloud 112 may cause the requests 108 stored in the request database 114 to be arranged in one or more queues 116. Although only two queues 116 are illustrated in FIG. 1, additional queues 116 also may be provided. In some implementations, the queues 116 may group the requests 108 in accordance with a type and/or a priority associated with the request. For example, one queue 116 may contain all requests to change aspects of the environment of the autonomous vehicle, e.g., lighting, sound, temperature, and the like, whereas another queue 116 may include requests to re-route the vehicle. Although the queuing structure may be desirable in some implementations, queues 116 may not be used in other implementations.

Requests 108 may not be limited to being received at the request cloud 112 from the HMI system 104. As illustrated in FIG. 1 in addition to requests from the HMI system 104, the request cloud 112 may also receive requests 108 from a user device 118 and/or from a fleet management system 120. The user device 118 may be any computing device, e.g., a handheld device, such as a smart phone, tablet, or laptop, a desktop computer, a wearable device, or the like, associated with a user 122. The user device 118 may run an application associated with the autonomous vehicle 102, such as a service that allows a user to request rides using the autonomous vehicle 102 and/or to control aspects of the autonomous vehicle 102. In some implementations, such as when the user 122 is in the autonomous vehicle 102, the user device 118 may interface with the HMI system 104, e.g., by syncing the device 118 to the autonomous vehicle 102, such that the user device 118 may be used by the user 122 to request changes to aspects of the autonomous vehicle 102, but the HMI system 104 will generate and send the request 108 to the request cloud 112. Alternatively, in some implementations, the user device 118 may generate a request 108 associated with the user's input and transmit the request 108 to the request cloud 112. In implementations in which the user 112 is not in or otherwise associated with the autonomous vehicle 102, requests generated via the user device 118 may be transmitted directly to the request cloud 12 from the user device 118. An example request 108 generated by the user device 118 may be a request to be picked up by the autonomous vehicle 102 and transported to a destination. The user device 118 may also be used to request information associated with a vehicle. For instance, via the user device 118, the user 122 may request the vehicle's location and/or an estimated time at which the vehicle 102 will arrive at a location associated with the user, e.g., to pick up the user for transport. In some examples, the request 108 submitted by the user 122 may not be sent directly to the "request" cloud 112. In such examples, the request 108 may be sent first to a public cloud (not pictured) which may verify the request before submitting it to the "request" cloud 112. By limiting access of the user 122 to public cloud access, attack vectors may be further reduced.

The fleet management system 120 may also generate requests 108 for queuing at the request cloud 112. By way of non-limiting example, the fleet management system 120 may comprise one or more computing devices used by a service technician or program. For instance, the fleet management system 120 may generate requests to update software or other components of the autonomous vehicle 102 or to receive diagnostic information related to the vehicle 102. Moreover, the fleet management system 120 may generate requests associated with movement of the vehicle. By way of non-limiting example, the fleet management system 120 may request that the vehicle traverse to a location to pick up a passenger, to a location to deliver a passenger, or to a location to perform maintenance. As noted above, the vehicle control systems 106 may be configured to prevent direct access thereto, and this may also limit access to the vehicle control systems 106 by a service technician or other fleet manager. Thus, the service technician and/or the fleet manager may generate requests in the same manner as the user 122 and the on-board HMI system(s) 104.

As also illustrated in FIG. 1, the architecture 100 may also include a request processing system 124. The request processing system 124 generally is configured to access requests 108 at the request cloud 112 and determine actions 126 to be taken by the autonomous vehicle 102 to satisfy the requests 108. For example, the request processing system 124 may access the queues 116 to determine whether there are pending requests. In some implementations, the request processing system may query the request database 114 and/or the request queues 116 and receive, in response to the query, a pending request 108. In some implementations, it may be desirable to have the request processing system 124 read the requests 108 from the request database 114, instead of having the requests written or otherwise transmitted directly to the request processing system. For example, this arrangement may be more secure, as allowing information to be sent directly to the request processing system 124 could provide additional attack vectors and vulnerabilities.

Having accessed a request 108, the request processing system 124 may confirm authenticity of the request. For instance, the request 108 may include information in addition to the desired outcome, and this information may be used to validate the request. For instance, an identifier, which may identify a source of the request, may be stored in the request database 114 and/or the queues 116 with each request. For instance, the identifier may identify that the request came from the autonomous vehicle 102 or from an authorized user device, such as the user device 118 associated with the user 122. Determining that the request originated at the autonomous vehicle 102 or at the authorized user device may be sufficient to authenticate the request at the request processing system 124. For example, the user device 118 may be authorized by having the user provide identifying information, e.g., upon downloading or activating an application associated with the autonomous vehicle 102 to the user device 118. In other implementations, if the request 108 does not include an identifier, or the identifier does not correspond to an identity associated with an authorized source, the request processing system 124 may deny authentication of the request, and take no further action. Other authentication systems will be appreciated by those having ordinary skill in the art, and could be implemented by the architecture 100 to allow the request processing system 124 to determine the authenticity of requests 108. By way of non-limiting example, requests uploaded to the request database 108 may be tagged with unique identifiers and or may be otherwise processed in accordance with one or more known encryption techniques.

Moreover, the requests may be authenticated by determining that the source of the request is authorized to make the request. For instance, different requesters may be authorized to request different actions. By way of non-limiting example, requests from the vehicle, either via an interface in the vehicle or a user device associated with a user in the vehicle, may be authorized to request changes to ambient conditions in the vehicle, whereas a user device associated with a user outside the vehicle may not be authorized to make requests to control aspects of the interior of the vehicle. In another example, a fleet management system may be authorized to make any request to the user vehicle, e.g., to update software associated with the vehicle, to control transportation of the vehicle to a different location, or to alter the internal environment of the vehicle, whereas other entities, including the vehicle, may not be able to make all such requests. Thus, although an entity may be authorized to make requests, that entity may not be authorized to make any and all requests, and the request processing system 124 may determine whether an entity submitting a request is authorized to make that request.

The request processing system 124 may also be configured to determine one or more actions corresponding to the request 108. For instance, upon authenticating a request 108, the request processing system 124 may determine an action 126 to be taken at the autonomous vehicle 102 in response to the request 108. By way of non-limiting example, the action 126 may be a change temperature action, a reroute action, or an "update software" action. Once created at the request processing system 124, the actions 126 may be written or transmitted to a remote computing environment configured to store actions 126. In FIG. 1, the remote computing environment is embodied as an action cloud 128, which may comprise a private cloud computing environment separate from the request cloud 112.

In connection with determining the action 126 to be carried out, the request processing system 124 may also determine that the action 126 should be carried out. For instance, the request processing system 124 may determine whether an action is safe or should otherwise be undertaken in response to the request. In one example, the request processing system may retrieve from the first database a request to open a door of the autonomous vehicle 102. The request may be an authentic request, i.e., from a vehicle authorized to make requests and the vehicle may be authorized to make the request to open the door. However, the request processing system 124 may determine that the appropriate action responsive to the request, e.g., opening the door, should not be undertaken. In this example, perhaps the vehicle is moving at a rate of speed that would make it unsafe to open the door.

Thus, the request processing system 124, the request cloud 112, and/or the action cloud 128 may be configured with logic or utilize other processing to authenticate devices or other entities that submit requests, to authenticate requests coming from those devices/entities, and/or to determine how and whether to respond to those requests. Such functionality may be performed by any of the request cloud 112, the request processing system 124, or the action cloud 128 or any combination thereof.

The action cloud may include storage, designated in FIG. 1 as an action database 130. In some implementations, the action database 130 may comprise one or more data stores configured to receive action jobs. As will be appreciated, information contained in the action database 130 may be distributed across multiple storage devices; the action database need not be a single physical drive or location. As also illustrated in FIG. 1, actions written to the action database 130 may be queued, such as at queues 132. Utilizing the queues, higher priority tasks may be performed before less important tasks. By way of non-limiting example, the queues may be differentiated based on the type of action to be performed or based on an identification of a system that would perform the action. For example, the architecture may include separate queues for each of HVAC actions, driving actions, sound system actions, etc. In still other implementations, the queues may prioritize based on latency toleration of the actions. For instance, a passenger in the autonomous vehicle that presses a button to turn on a light may expect the light to turn on instantaneously. However, the same user may not expect the ambient temperature to change immediately in response to a request to lower the temperature. Accordingly, actions associated with requests to alter lighting may be prioritized over actions associated with adjusting the HVAC. Moreover, priority may be determined based on criticality, e.g., software updates that may prevent harm to the vehicle and/or passenger(s) of the vehicle may be prioritized over requests to alter ambient features in the vehicle. At least some of the queues 126 may generally correspond to the queues 116. For example, one of the request queues 116 may include requests associated with servicing the vehicle 102, e.g., software updates, and one of the action queues 126 may include actions associated with servicing the vehicle 102. In practice, the queues may be highly configurable, and allow for modification and optimization of the architecture 100.

As illustrated by arrow 134, the vehicle control system 106 accesses the action cloud 128 to retrieve actions 126. In some examples, the vehicle control system 106 may query the action cloud 128 for actions relating to the autonomous vehicle 102. Upon receiving one or more actions in response to the query, the vehicle control system(s) 106 may control one or more functions at the autonomous vehicle to implement the action. In examples described herein, the vehicle control system may access the actions 126 at the action cloud 128, instead of receiving the actions 126 from the action cloud. By reading the actions from the action cloud 128 in this manner, the architecture 100 may prevent hacking attempts that would attempt to write directly to the vehicle control system 106.

In FIG. 1, the request processing system 124 is illustrated as an entity distinct from the request cloud 112 and from the action cloud 128. However, the illustration is merely for illustrative purposes. While the request processing system 124 may be embodied as a completely separate computing device or environment, some or all of the functionality associated with the request process system may be performed by the computing environment identified as request cloud 112 and/or the computing environment identified as the action cloud 128. Moreover, the request cloud 112, the action cloud 128 and/or the request processing system may all be associated with a single computing environment, such as a remote cloud computing environment. According to implementations of this disclosure, the acts of retrieving or accessing the requests 108, authenticating the requests 108, determining an associated action 126, queuing the action 126 and/or causing the associated action to be stored at the action cloud 128 may be performed across multiple systems. By way of non-limiting example, the act of authenticating requests may be performed by the computing environment embodied by the request cloud 112, whereas determining the actions associated with requests and/or queuing the action 126 may be performed by the computing environment embodied by the action cloud 128. In some implementations, aspects of the request processing system 124 may be embodied as one or more web workers associated with a computing environment.

According to the architecture 100, requests are routed to a location remote from the autonomous vehicle 102 for processing and the autonomous vehicle 102 retrieves actions from a remote location. All manner of requests may be acted upon in this way, such that direct communication between the HMI system(s) 102 and the vehicle control system(s)

104 is minimized or eliminated. The architecture 100 may allow for communication and control of many vehicles, including a fleet of autonomous vehicles. For instance, actions may be associated with one or more vehicles. Accordingly, when the autonomous vehicle 102 queries the action database for pending actions, only those actions associated with the autonomous vehicle 102 will be returned. Similarly, when an action applies to more than one vehicle, the architecture 100 may provide a means to broadcast actions to more than one vehicle, e.g., by associating the action with the autonomous vehicle 102 and with at least one other vehicle. Additional details of the HMI system(s) 104, the request processing system 124, and the vehicle control system(s) 106 will be described in more detail below, with reference to FIGS. 2-4. (s)

Figure 2:
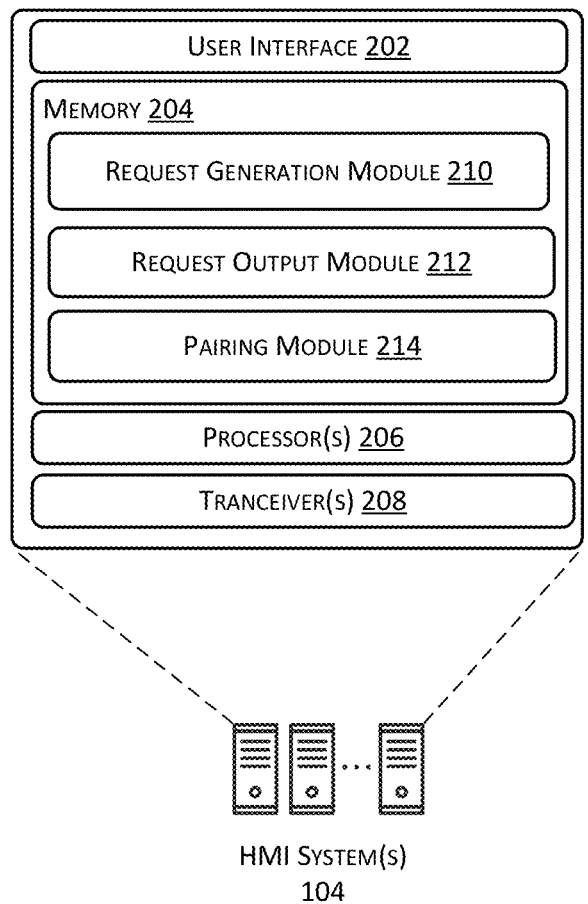
FIG. 2 is a block diagram of an example first computing system associated with the architecture of FIG. 1.

FIG. 2 is a block diagram showing components of the HMI system(s) 104. Specifically, the HMI system(s) 104 may include a user interface 202, memory 204, one or more processors 206, and one or more transceivers 208.

The user interface 202 may include any component configured to receive an instruction from a user, e.g., a passenger, indicative of a request to interact with the vehicle. For example, the user interface 202 may include one or more of buttons, switches, knobs, interactive displays, e.g., touch screen displays, microphones configured to receive verbal inputs, sensors configured for facial or gesture recognition, or the like. In other examples, the user interface 202 may be facilitated by a user device paired to or otherwise communicating with the vehicle or the HMI system(s) 104. In some implementations, the user interface 202 may be any component(s) capable of creating a signal or information indicative of an instruction or command.

In various examples, the memory 204 is non-transitory computer-readable media. Non-transitory computer-readable media may include volatile and nonvolatile, removable and non-removable tangible, physical media implemented in technology for storage of information, such as computer readable instructions, data structures, program modules, or other data. Non-transitory computer-readable media include, but are not limited to, Random Access Memory (RAM), Read Only Memory (ROM), electronically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other tangible, physical medium which can be used to store the desired information.

In examples of this disclosure, the memory 204 includes a request generation module 210 configured to generate requests related to a vehicle, such as the autonomous vehicle 102. For example, the request generation module 210 may be configured to receive one or more signals from the user interface and, based on the signals, determine a request. In one example, a passenger of a vehicle, such as the autonomous vehicle 102, may interact with a user interface to instruct a temperature change. The passenger may verbalize the instruction to change the temperature to a voice-control interface including a microphone, or may interact with a touch screen or button to instruct the change, for example. The request generation module receives one or more signals associated with the instruction and creates a temperature change request. Requests generated by the request generation module may take any known format, including a known messaging format. Each request may include various types of information about the request. For example, in the temperature change example, the change request may include a desired ambient temperature, a desired relative temperature change (e.g., cooler by three degrees, warmer by four degrees), or a request to turn an aspect of an HVAC system on or off. Additionally, the change request may include one or more of a vehicle identification, which may associate the request with the vehicle, a user identification, which may associated the request with a specific user, or some other information. Moreover, the request generation module 210 may utilize encryption or similar techniques, depending upon the application.

In implementations of this disclosure, the request generation module 210 may generate a request for any instruction related to the vehicle, e.g., any request that would have the vehicle take an action. For example, a user may desire to change ambient conditions, e.g., temperature, lighting, sound, and/or audio outputs associated with the vehicle. Moreover, the user may desire to interact with electromechanical systems of the vehicle. For instance, the user may desire to adjust her seat, open or close one or more windows, or adjust a suspension of the vehicle, e.g., to change characteristics of the ride. In still other implementations, the user may desire to alter characteristics associated with controlling the vehicle. For example, a user may specify an alternate destination, which could prompt changes to the acceleration, braking, and or steering of the vehicle, or may instruct a maximum speed for the vehicle. In still other examples, a request may be for information about or associated with the vehicle. For example, a passenger may desire to know an estimated time of arrival at a destination or a current external temperature. Other requests will be appreciated by those having ordinary skill in the art with the benefit of this disclosure.

The memory 204 may also include a request output module 212 configured to transmit requests to a remote computing system, such as the remote computing environment identified as the request cloud 112 in FIG. 1. For example, the request output module may cause transmission of requests using the transceivers 208. In implementations of this disclosure, for example, the request may be transmitted over a cellular network.

The memory 204 may also include a pairing module 214 configured to pair an external device to the HMI systems 104. For instance, the pairing module may facilitate syncing of a device, such as the user device 118 of FIG. 1, with the autonomous vehicle 104. In this manner, the HMI system 104 may receive instructions via the external device. For example, the pairing module 214 may allow the user device 118 to act in a manner substantially similar to the user interface 202. In examples of this disclosure, the pairing module 214 may facilitate connection of the electronic device to the vehicle using any wireless connection, e.g., BlueTooth®, or a similar protocol.

In some examples, the processor(s) 206 can comprise a central processing unit (CPU), a graphics processing unit (GPU), both a CPU and a GPU, or any other sort of processing unit. The processor(s) 206 can be responsible for running software, including the request generation module 210, the request output module 212, and/or the pairing module 214, as well as for interpreting and sending messages, if applicable.

The transceivers 208 may be configured to facilitate receipt of requests associated with a vehicle, such as the autonomous vehicle 102, and/or to facilitate transmission of such requests in accordance with this disclosure. For example, the transceivers 208 may facilitate transmission of requests to change or update attributes of the autonomous vehicle to a remote computing environment, such as the request cloud 112. In some implementations, the transceiver (s) 208 may include a radio transceiver that performs the function of transmitting and receiving radio frequency communications via an antenna (e.g., cellular, Wi-Fi, or Bluetooth®). In other implementations, for example, information about requests received via the user interface 202 and/or via a paired device may be transmitted to the request cloud 112 via a cellular antenna. In still other implementations of this disclosure, the transceivers 208 may include one or more wireless modems to facilitate wireless connectivity, e.g., with the request cloud 112, a central server, other vehicles, the Internet, and/or an intranet. The transceiver(s) 208 may also include wired communication components, such as a wired modem or Ethernet port, for communicating with a LAN. In some implementations, the transceivers 208 may include duplicate transceivers of one or more types. For instance, two cellular antennas may be provided, both configured to send the same requests to the request cloud 112. The two antennas provide redundancy, with the request cloud 112 being configured to determine that the two requests are actually one request sent twice, and considering the double request only once.

Figure 3:
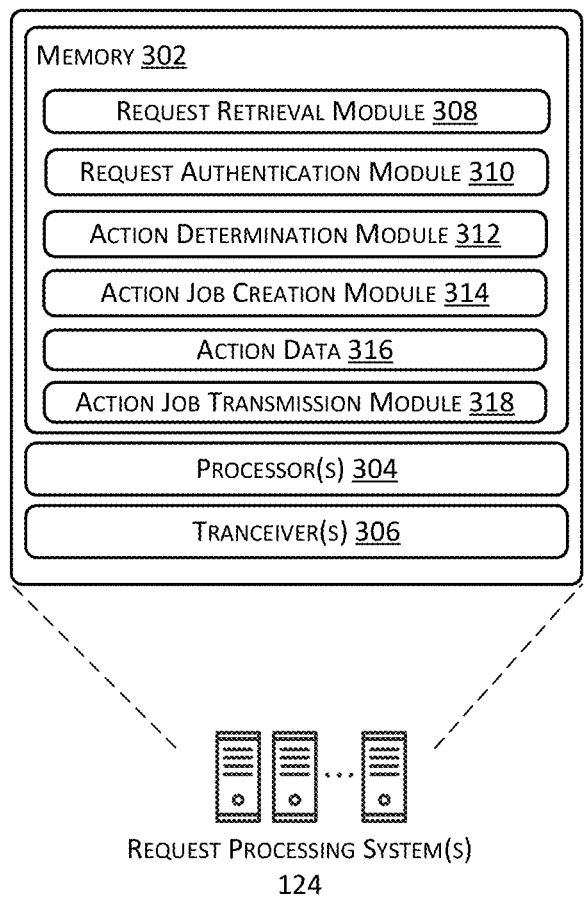
FIG. 3 is a block diagram of an example second computing system associated with the architecture of FIG. 1.

FIG. 3 is a block diagram showing components of the request processing system 124. Specifically, the request processing system 124 may include memory 302, one or more processors 304, and one or more transceivers 306.

In various examples, the memory 302 is non-transitory computer-readable media. Non-transitory computer-readable media may include volatile and nonvolatile, removable and non-removable tangible, physical media implemented in technology for storage of information, such as computer readable instructions, data structures, program modules, or other data. Non-transitory computer-readable media include, but are not limited to, RAM, ROM, EEPROM, flash memory or other memory technology, CD-ROM, DVD or other optical storage, magnetic cassettes, magnetic tape, magnetic disk storage or other magnetic storage devices, or any other tangible, physical medium which can be used to store the desired information.

In examples of this disclosure, the memory 302 includes a request retrieval module 308 configured to retrieve requests. For example, the request retrieval module 308 may be configured to access requests stored in a database, such as the request database 114. In some implementations, the request retrieval module 308 may pull request jobs from a queue associated with the request database.

The memory 302 may also include a request authentication module 310 configured to authenticate requests. For instance, the request authentication module 310 may be configured to determine that a retrieved request is from an authorized source. In some implementations, the request authentication module 310 may analyze data associated with the request to determine that the request is from an associated vehicle, such as the autonomous vehicle 102, from an authorized service system, such as the system 120, or from an authorized user device, such as the user device 118. In some instances, requests may include tags, unique identifiers, or other information that may be verified by the request authentication module 310, e.g., by comparing the information to information in a request generation module configured to generate requests to change attributes of a vehicle, such as the autonomous vehicle 102. The request authentication module 310 may also determine whether an authorized requester is authorized to make the specific request and/or whether the request should be carried out at the specific time. For example, regarding the former, some authorized users may be limited in the requests they make, and thus requests may be denied accordingly. Regarding the latter, some requests may be unsafe or impractical and thus would not be authenticated.

In some implementations, the memory 302 may also include an action determination module 312 configured to determine an action to be taken by a vehicle in response to a request, and an action job creation module 314 configured to create an action job based on the action determined by the action determination module 312. In some implementations, for example, the action job may be determined based on action data 316. The action data 316, for example, may include information that associates action jobs with requests. The action data 316 may also include information about one or more devices at the vehicle that may carry out the action. The action job may take any known format and may be configured to be stored in a database, such as the action database 130. The action jobs may also include associated information. For instance, the action jobs may have associated information that identifies a vehicle or vehicles on which the action job is to be carried out and/or information indicative of a priority or other classification of the action. For instance, the additional information may be used to queue the action job at a database, such as the action database 130.

The memory 302 may also include an action job transmission module 318 configured to upload or otherwise store action jobs to a database. For example, the action job transmission module 318 may cause action jobs created by the action job creation module 314 to be stored at the action database 130. As discussed above, in implementations of this disclosure, the action database 130 may be a remote (from the autonomous vehicle) computing environment, which may be implemented as a private cloud, for example. The action job transmission module 318 may also be configured to queue action jobs at the action database 130, although in other implementations a database management system or other rules-based software or the like may be used to queue action jobs for retrieval by the autonomous vehicle 102.

In some examples, the processor(s) 304 can comprise a CPU, a GPU, both a CPU and a GPU, or any other sort of processing unit. The processor(s) 304 can be responsible for running software, including the request retrieval module 308, the request authentication module 310, the action determination module 312 and/or the action job creation module 314, as well as for interpreting and sending messages, if applicable.

The transceivers 306 may be configured to facilitate retrieval of the requests and/or to facilitate transmission of the action jobs, in some examples. Moreover, the transceivers 306 may include functionality for receiving additional requests from outside sources, e.g., sources authorized to submit requests. For example, teleoperator systems, which may be configured to assist with navigation of the vehicle 102, or sources associated with customer service, e.g., for ride-fulfillment or information request purposes, may be authorized to submit requests or actions directly to the request processing system. The transceivers 306 may include any sort of transceivers known in the art. For example, the transceiver(s) 306 may include a radio transceiver that performs the function of transmitting and receiving radio frequency communications via an antenna (e.g., cellular, Wi-Fi, or Bluetooth®). In other implementations of this disclosure, the transceivers 306 may include one or more wireless modems to facilitate wireless connectivity, e.g., via the Internet, and/or an intranet. The transceiver(s)

306 may also include wired communication components, such as a wired modem or Ethernet port, for communicating with a LAN.

Figure 4:
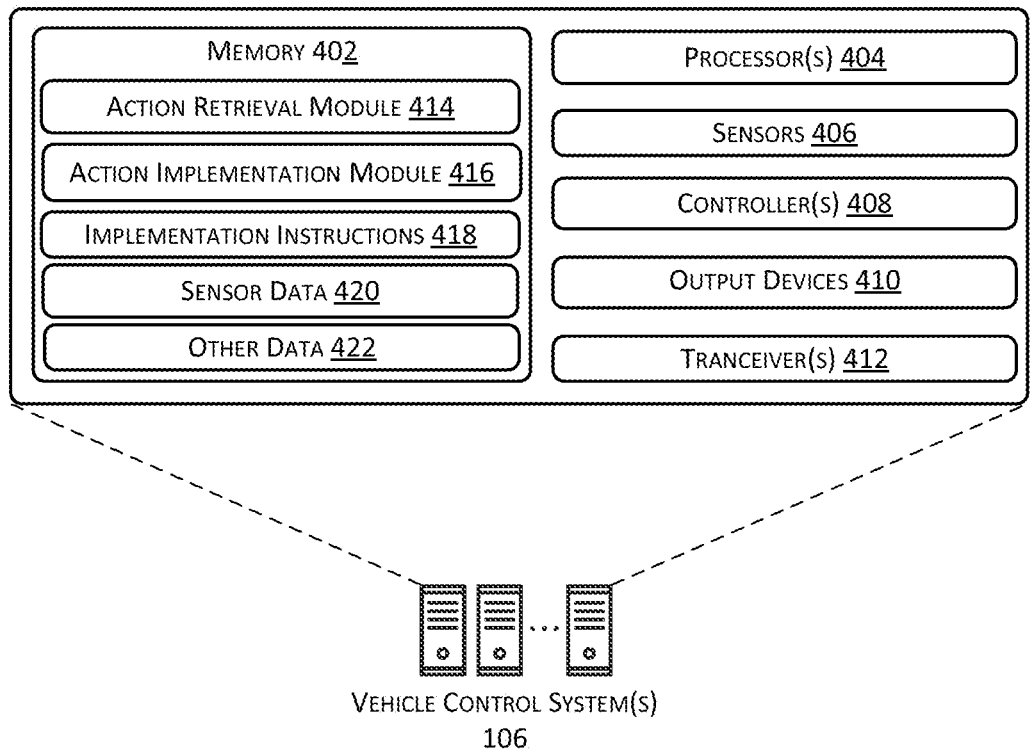
FIG. 4 is a block diagram of an example third computing system associated with the architecture of FIG. 1.

FIG. 4. is a block diagram showing components of the vehicle control system 106. Specifically, the vehicle control system 106 may include memory 402, one or more processors 404, sensors 406, one or more controller(s) 408, one or more output device(s) 410, and one or more transceivers 412.

In various examples, the memory 402 is non-transitory computer-readable media. Non-transitory computer-readable media may include volatile and nonvolatile, removable and non-removable tangible, physical media implemented in technology for storage of information, such as computer readable instructions, data structures, program modules, or other data. Non-transitory computer-readable media include, but are not limited to, RAM, ROM, EEPROM, flash memory or other memory technology, CD-ROM, DVD or other optical storage, magnetic cassettes, magnetic tape, magnetic disk storage or other magnetic storage devices, or any other tangible, physical medium which can be used to store the desired information.

In examples of this disclosure, the memory 402 includes an action retrieval module 414 configured to retrieve action jobs. For example, the action retrieval module 414 may be configured to access action jobs stored in a database, such as the action database 130. The action retrieval module 414 may pull action jobs from a queue associated with the action database. In some implementations, the action retrieval module 414 may be configured to query the action database at predetermined time intervals. As noted above, in some implementations of this disclosure it may be desirable that the actions be carried out more quickly, e.g., substantially instantaneously, in which case the action retrieval module 414 may query the action database at relatively smaller time intervals, e.g., 50-200 ms. In other implementations, the action retrieval module 414 may retrieve action jobs at some different interval, e.g., 1 second or 5 second intervals. In still other implementations, the action retrieval module 414 may retrieve jobs in an on-demand manner. For instance, the autonomous vehicle may be configured to retrieve action jobs related to service and/or maintenance only when the vehicle is parked, passenger-less, and/or coupled to a power source. Moreover, the vehicle control system(s) 106 may be configured to receive alerts or other messages that trigger the action job retrieval module to query the action database. When alerts are used, such alerts may be received separately from action jobs, i.e., to prevent access to vehicle controls systems that could be hacked via transmission of the alert.

The memory 402 may also include an action implementation module 416 configured to control the autonomous vehicle to perform one or more actions in accordance with the retrieved action job. For instance, the action implementation module 416 may generate instructions for various controller(s), such as the controller(s) 408, to control one or more output devices, such as the output device(s) 410. In some implementations, the action implementation module 416 may access implementation instructions 418, e.g., stored in the memory 402, to determine details for implementing the retrieved action. Depending upon the action, the action implementation module 416 may also access sensor data 420 or other data 422 pertinent to the request. Sensor data 420 may include data from one or more of the sensor(s) 406. By way of non-limiting example, the sensor data 420 may inform the action implementation data 416 about a current state or states of the autonomous vehicle, which could be useful in carrying out an action. For instance, sensor data may include an ambient temperature inside the vehicle, which would be useful in carrying out a change temperature action. Other data 422 may include any other information that could be useful to the action implementation module 416. In some implementations, other data could include information about user preferences, current software configurations and versions, or the like. As noted above, in implementations of this disclosure, any or all actions associated with an autonomous vehicle may be undertaken in response to requests processed according to the architecture 100.

In some examples, the processor(s) 404 can comprise a CPU, a GPU, both a CPU and a GPU, or any other sort of processing unit. The processor(s) 404 can be responsible for running software, including the action retrieval module 414 and/or the action implementation module 416, as well as for interpreting and sending messages, if applicable.

The sensor(s) 406 may be any device or devices capable of perceiving information about the autonomous vehicle and outputting data relative to that information. Such data may be stored as the sensor data 420, for example. For instance, the sensor(s) 406 may include components such as, for example, cameras, accelerometers, GPS receivers, cellular and wireless transceivers, magnetometers, altimeters, compasses, LIDARs, radars, ultrasonic transducers, gyroscopes, and other equipment, which can be used to compile and send data. The cameras can include, but are not limited to, low- and high-resolution digital still and video cameras, stereoscopic cameras—which may be capable of providing ranging information—and vehicle camera arrays (e.g., parking cameras) with multiple views. The sensors may also include one or more of touch sensors, e.g., associated with displays, IMUs, microphones, thermometers, position sensors, or the like.

The controller(s) 408 may include any hardware- and/or software-based controller or micro-controllers and/or other processors configured to control automotive functions or functions associated with the autonomous vehicle 102. For instance, the controller(s) 408 may be configured to control the output devices 410. By way of example and not limitation, the controller(s) 408 may control acceleration, braking, steering, temperature-change functionality (e.g. HVAC commands), window and door opening and closing, sound system functionality, lighting, and/or any and all other attributes of the vehicle.

The output device(s) 410 may include any and all functioning components associated with the autonomous vehicle. For example, the output device(s) 410 may be the components that are adjusted by the controller(s) 408 to carry out the action jobs. For instance, windows, doors, HVAC components, display surfaces (e.g. screens), lights, speakers, seats, brakes, wheels, motors, engines, and/or other controllable components may be the output device(s) 410. Although not specifically illustrated, the controller(s) 408 may be in communication with the output device(s) 410, e.g., via one or more communication infrastructures (not shown) may be provided. For example, the controller(s) 408 may be connected to the output device(s) 410 via a Controller Area Network (CAN) bus. Other communication infrastructures may also or alternatively be used.

The transceivers 412 may be configured to facilitate retrieval of the action jobs, in some examples. The transceivers 412 may include any sort of transceivers known in the art. For example, the transceiver(s) 412 may include one or more radio transceivers that perform the function of transmitting and receiving radio frequency communications via an antenna (e.g., cellular, Wi-Fi, or Bluetooth®). For instance, the action jobs may be retrieved from the action database over a cellular network. In other implementations of this disclosure, the transceivers 412 may include one or more wireless modems to facilitate wireless connectivity, e.g., via the Internet, and/or an intranet. The transceiver(s) 412 may also include wired communication components, such as a wired modem or Ethernet port, for communicating with a LAN. In some implementations, the transceivers may also be used to facilitate communication between the controllers 408 and the output devices 410. For example, the transceivers 412 may facilitate retrieval (e.g., from memory or an external source) of content to be displayed on a video screen and/or output over speakers in the vehicle.

Figure 5:
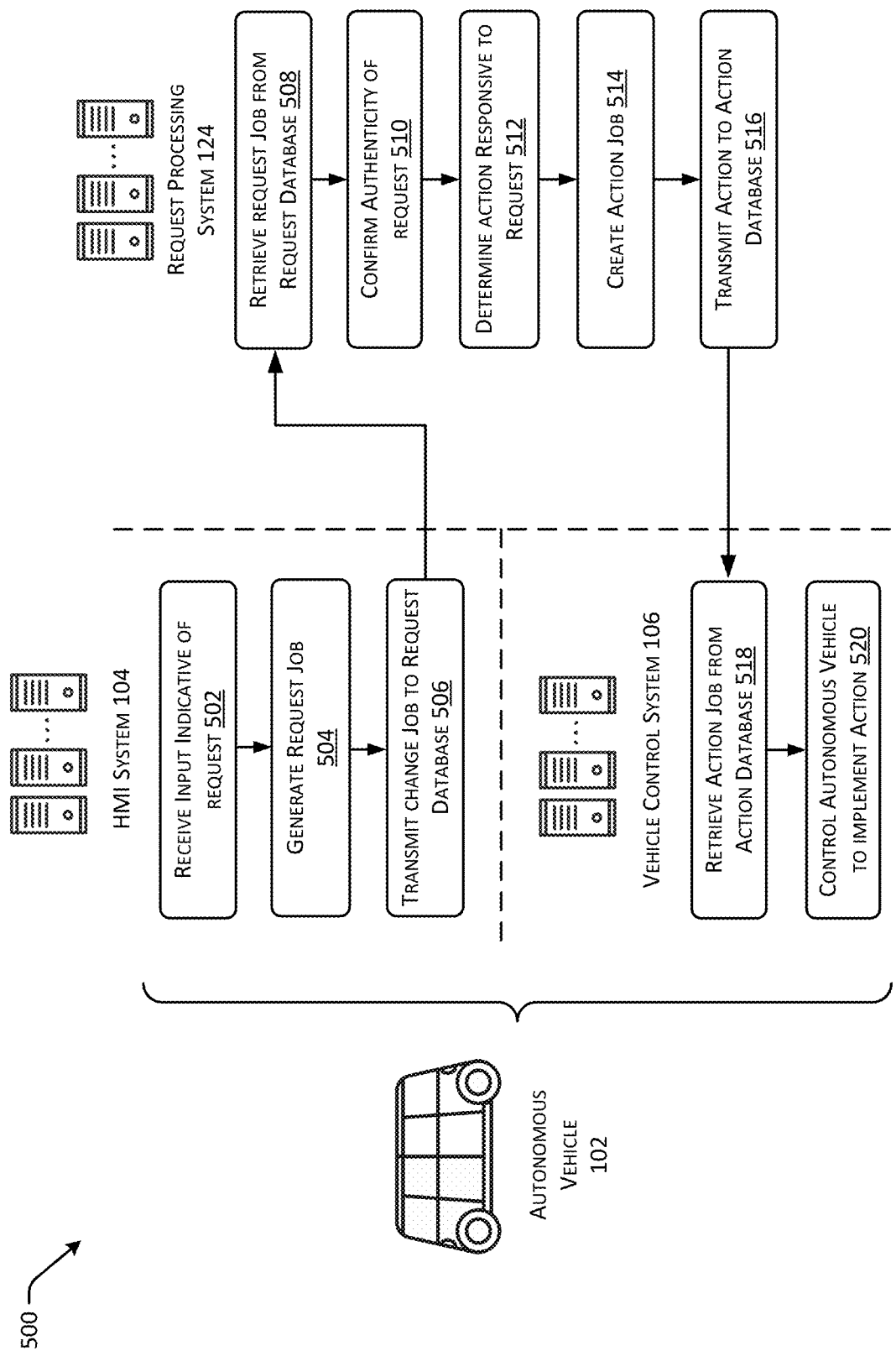
FIG. 5 is a flow diagram of example processes for controlling operations associated with receiving requests and implementing actions in response to those requests in the architecture of FIG. 1.

FIG. 5 is a flow diagram illustrating an example process 500 for receiving and responding to requests in an autonomous vehicle system. The process may be implemented using the architecture 100 discussed above, and in FIG. 5, various acts are associated with one of the HMI system 104, the request processing system 124, and/or the vehicle control system 106. The systems illustrated as performing the acts are for example purposes only. The disclosure is not limited to the identified system/act correlation. As will be appreciated by those having ordinary skill in the art, many of the acts may be performed by any of the illustrated systems, or by some other (not illustrated) system or subsystem.

The process 500 shown in FIG. 5 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors (e.g., by one or more of the processors 206, 304, 404, 606 or other components), cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

It should be appreciated that the subject matter presented herein may be implemented as a computer process, a computer-controlled apparatus, a computing system, or an article of manufacture, such as a computer-readable storage medium. While the subject matter described with respect to the process 500 is presented in the general context of operations that may be executed on and/or with one or more computing devices, those skilled in the art will recognize that other implementations may be performed in combination with various program/controller modules. Generally, such modules include routines, programs, components, data structures, and other types of structures that perform particular tasks or implement particular abstract data types.

Those skilled in the art will also appreciate that aspects of the subject matter described with respect to the process 500 may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

In FIG. 5, the process 500 includes, at 502, receiving input indicative of a request to an autonomous vehicle system. As detailed above, the request may include a request to change an attribute of the vehicle, such as the ambient temperature lighting, a request to obtain information about the vehicle, such as a estimated time of arrival at a location, or a request to update or service the autonomous vehicle, such as a request to update software associated with an autonomous vehicle. In some implementations, the request may be made at an autonomous vehicle, e.g., from inside the vehicle or outside the vehicle and/or via an HMI system. For instance, the request may be made via an application running on a local (to a user) device and sent to a system associated with the autonomous vehicle. For example, the request may be made to a dispatch or other fleet management system charged with maintaining and/or overseeing a fleet of vehicles, such as a fleet including the autonomous vehicle 102. In still other implementations, the request may come from a service technician or other third party. Although the receipt of the requests is associated with the HMI system(s) in this example implementation, as illustrated in FIG. 1, instructions originated at locations other than the vehicle HMI system(s) 104 may be transmitted directly to the request database, instead of being first routed through the HMI system(s) 104.

The process 500 also includes, at 504, generating a request associated with the input received at 502. For instance, as detailed above, the HMI system 104 may be configured to generate a request including information about the request received at 502. For instance, the request may include details about the request including a source from which the request was received, a type of the request, and/or additional details including, but not limited to, information to authenticate the user and associate the request with the vehicle. Having generated the request at 504, the method also includes, at 506, transmitting the request to a request database. In implementations described herein, the database may be a remote database, separate from the autonomous vehicle. In some examples, the database may be associated with a private cloud computing environment.

The process 500 also includes, at 508, retrieving requests from the request database. Thus, in implementations of this disclosure, a separate system, such as the request processing system 124 retrieves requests from the request database. As noted above, the request processing system 124 may query the request database for access to pending requests, instead of the HMI system 104 sending the requests directly to the request processing system 124. However, in some implementations, the request processing system may receive the requests directly, as discussed above.

The process 500 may also include, at 510, confirming authenticity of the request. For example, at 510, the request processing system 124 may verify that the request is from a credible source. For instance, the request may include identification information, such as a unique identifier associated with the source of the request, and the request processing system may have a database including information about authenticated requesters. Thus, at 510, requests to access the system that are not from an authorized source may be ignored or forwarded to some other system for further consideration, e.g., a system associated with a fleet management system. In other embodiments, known encryption schemes may be used at 510 to verify the authenticity of the retrieved request. Moreover, at 510, the process may verify that the credible source is authorized to make the specific request. For example, a passenger in the autonomous vehicle may be authorized to make requests associated with certain features and/or attributes of the vehicle, but may not be authorized to request an update to software associated with the vehicle. Also at 510, the process may take into account additional factors, such as whether carrying out the action is safe in determining whether to authenticate the request. For example, in considering a request that the vehicle traverse to some remote location, at 510, the process 500 may determine that the request is from an authentic source and that source is authorized to make requests to change a destination of the vehicle, but the process 500 may determine that the appropriate action of traversing to the far away location is not safe, e.g., because the vehicle may not have enough power to make the trip, and may decline to authenticate the request.

At 512, the process 500 may also include determining an action responsive to the request. In some examples, this determination may be made after confirming authenticity of the request at 510. In some examples, 512 may include consulting action data which may store associations between requests and actions. At 514, the process 500 may include creating an action job, and at 516, the action job may be transmitted to an action database. In implementations of this disclosure, the action job is created at 514 based on the action determined at 512. For instance, the action job may include an instruction to carry out the action. Transmission of the action to the action database may include writing the action job to a database associated with a computing environment, such as a private cloud computing network. In implementations of this disclosure, the action database is separate from the request database and also separate from the autonomous vehicle. In some implementations, the request processing system 124 may be the only computing system authorized to write to the action database. However, in other examples, other entities may be authorized. For example, teleoperators, or other driver-assist entities, which may be located external to the vehicle, may have access to write actions to the action database. For instance, in some implementations of this disclosure, the autonomous vehicle 102 may be in a location or situation that requires manual input. As described above, in some implementations of this disclosure, an autonomous vehicle, such as the vehicle 102, may not include a driver or passenger override capabilities. Instead, an external third-party may be tasked with controlling the vehicle from a remote location. In some implementations, it may be desirable to allow such an external third-party to upload actions directly to the action database. Moreover, it may be desirable to allow other third parties to upload action jobs. For instance, although the fleet management system was described above as being requested in the same manner as other requests, authorized fleet management systems may be able to write action jobs directly to the action job database. In other implementations, other entities may also have authorization to control some aspects of vehicles. For example, emergency response vehicles may be able to transmit actions to an action database, e.g., to divert vehicles from hazardous situations, and/or to clear a road for safe passage by the emergency response vehicle. However, in still other implementations and in accordance with portions of this disclosure, such third parties may instead be required to submit requests for processing by the request processing system 124.

The method may also include, at 518, retrieving action jobs from the action database. In implementations of this disclosure, the vehicle control system 106, or some other system at the autonomous vehicle 102, retrieves action jobs from the action database, i.e., by reading such jobs from the action database. In some examples, 516 may include querying the action database for action jobs associated with the autonomous vehicle 102. Because a number of autonomous vehicles, including the autonomous vehicle 102, may use the architecture 100, the action database may store action jobs to be associated with one or more vehicles. Thus, the action jobs may be tagged or otherwise related to specific vehicles. At 518, action jobs associated with a specific vehicle are retrieved. In some examples, the vehicle control system 106 may be configured to perform the action 518 at a predetermined interval. For instance, the vehicle control system 106 may query the action database every 200 ms. In other implementations, the action jobs may be queued at the action database and queries to the action database may be to specific queues. For instance, the vehicle control system 106 may query a queue associated with software updates less frequently than it would query a queue associated with passenger comfort features and/or travel control features. In still other embodiments, vehicles may receive alerts, such as from the HMI system(s) 104 or from the request processing system 124, alerting the vehicle to awaiting action jobs. Such messaging may be carried out separate and apart from control systems associated with the autonomous vehicle 102, such that receipt of such messages will not also allow access to the vehicle control system 106.

The process 500 may also include, at 520, controlling the autonomous vehicle to implement the action. As noted above with regard to FIG. 4, the autonomous vehicle may include any number of controllable attributes, and 520 may include identifying one or more correct output device(s) to carry out the action job and providing any additional details required for carrying out the job.

As will be appreciated, the process 500 allows for a request to be routed away from a vehicle and processed at a remote computing environment. This remote processing may result in confirming both the authenticity of the request, and determining a correct action corresponding to the request. Because the authentication happens away from the vehicle, attacks and hackers may be discovered and thwarted, for example. Moreover, because the vehicle control system 106 is configured only to read action jobs from an action job database, it may not include functionality to receive direct input of action jobs, thus also reducing the likelihood of hackers taking control of functionality of the vehicle. In some implementations, the request jobs may be screened and/or the action jobs may be created and uploaded by web workers associated with a remote computing environment, such as one or more private clouds, as in the architecture 100 discussed above. In some implementations, the web worker may authenticate a request, determine an action, and/or create and upload an action job to the action database in milliseconds. Moreover, because of the increasing speed of cellular networks, the entire process 500 may be performed in the matter of less than approximately 100 to 200 ms, which a passenger would view as substantially instantaneous. In some implementations of this disclosure, request jobs and action jobs may also be queued according to their criticality. For example, jobs that a user would expect to be carried out instantaneously, could be prioritized over jobs that the passenger may expect to take several seconds or longer. By way of non-limiting example, a request to turn on a light in the vehicle may be prioritized over a request to raise the temperature by 3-degrees. Latency or an expected latency may be only one factor that could be used to determine appropriate priorities. For instance, actions that, if not taken, could result in harm to the passenger, may be prioritized over all other actions. By way of non-limiting example, software updates to fix glitches or bugs in an operating system or software associated with the vehicle 102 may be prioritized over all other action jobs.

Thus, FIG. 5 is used to describe example methods of using a security architecture, such as the architecture 100. The architecture may also be utilized in other ways. For example, the remote computing systems, e.g., one or more of the request cloud 112, the request processing system 124, and/or the action cloud 128 may be used to transmit information to entities in response to requests. For instance, an entity such as a fleet management system 120 may request sensor read-out information, e.g., for diagnostic purposes. In response to the request, the requested sensor information may be uploaded or otherwise written to the action database or the request database. There, the fleet management system 120 may query the appropriate database to receive the information. In this manner, as in other implementations discussed herein, transmission and retrieval of information is controlled in a manner that may prevent attacks to the vehicle. Those having ordinary skill in the art with the benefit of this disclosure will understand that other information may be transmitted using aspects of this disclosure.

Figure 6:
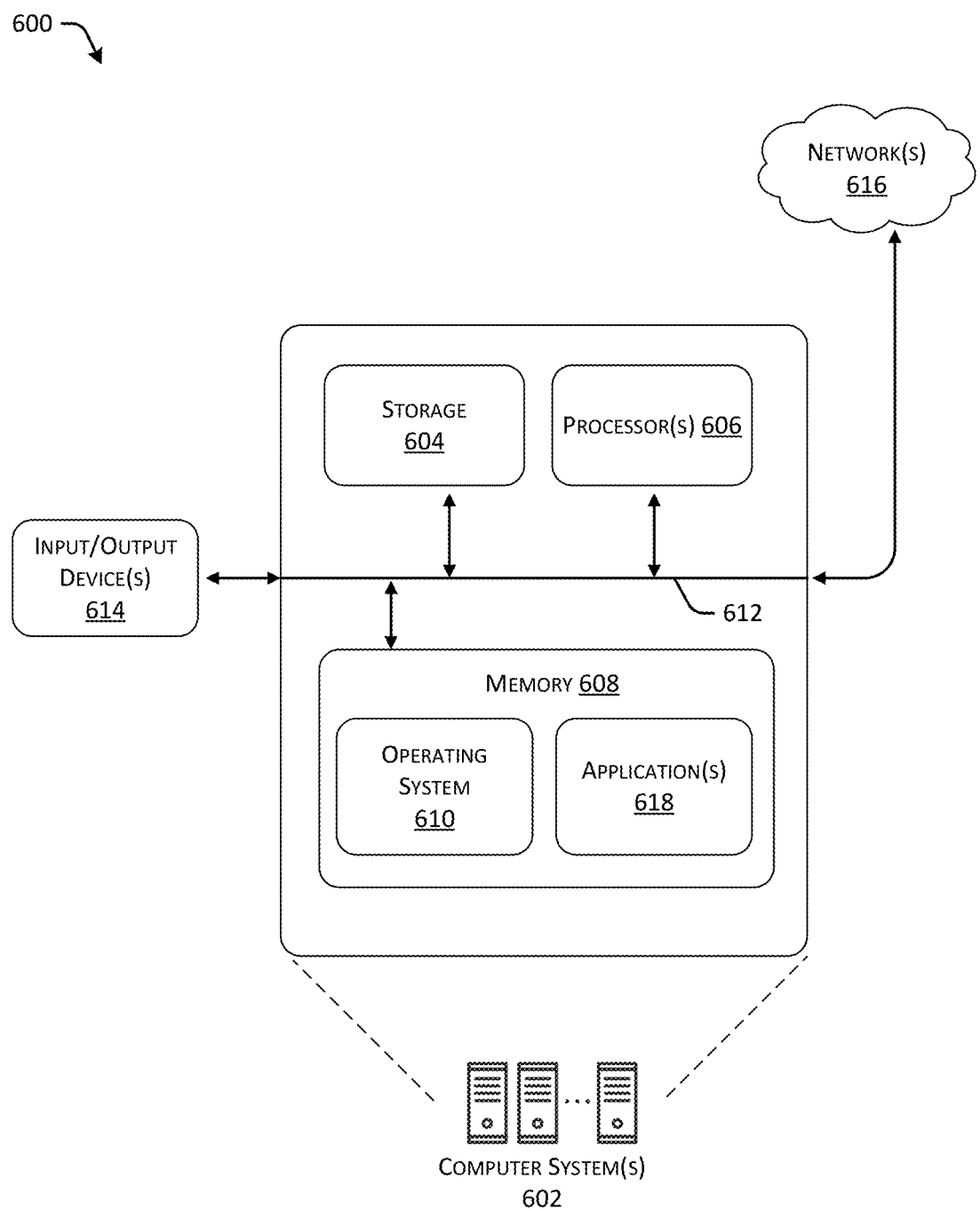
FIG. 6 is a block diagram of a computing system associated with the architecture of FIG. 1.

FIG. 6 is a block diagram of an example architecture 600 including vehicle systems 602 for controlling operation of the systems that provide data associated with operation of a vehicle, such as the vehicle 102 and that carry out operations associated with this disclosure. For example, the architecture 600 may be indicative of elements of the systems 104, 106 and 124 described in detail above. The example computer systems 602 that comprises storage 604, one or more processor(s) 606, memory 608, and an operating system 610. The storage 604, the processor(s) 606, the memory 608, and the operating system 610 may be communicatively coupled over a communication infrastructure 612. Optionally, the computer system(s) 602 may interact with a user, or environment, via I/O devices 614, as well as one or more other computing devices over a network 616, via the communication infrastructure 612. The operating system 610 may interact with other components to control one or more applications 618.

In various implementations, the architecture 600 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor may commonly, but not necessarily, implement the same ISA. In some examples, the processor(s) may include a CPU, a GPU, or a combination thereof.

The example architecture 600 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the architecture 600 via an I/O interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In some implementations, the I/O interface may be configured to coordinate I/O traffic between the processor(s), the non-transitory computer readable media, and any peripheral devices, the network interface, or other peripheral interfaces, such as input/output devices. In some implementations, the I/O interface may perform any necessary protocol, timing, or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

An exemplary environment and computerized system for implementing the systems and methods described herein is illustrated in FIG. 6. A processor or computer system can be configured to particularly perform some or all of the methods described herein. In some embodiments, the methods can be partially or fully automated by one or more computers or processors, such as the HMI system(s) 104, the request processing system(s) 124, and/or the vehicle control system(s) 106. The systems and methods described herein may be implemented using a combination of any of hardware, firmware and/or software. The present systems and methods described herein (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the systems and methods described herein may be directed toward one or more computer systems capable of carrying out the functionality described herein. Example computing devices may be, but are not limited to, a personal computer (PC) system running any operating system such as, but not limited to, OS X™, iOS™, Linux™, Android™, and Microsoft™ Windows™. However, the systems and methods described herein may not be limited to these platforms. Instead, the systems and methods described herein may be implemented on any appropriate computer system running any appropriate operating system. Other components of the systems and methods described herein, such as, but not limited to, a computing device, a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, RAM, and a secondary memory, etc. The secondary memory may include, for example, a hard disk drive and/or a removable storage drive, such as a compact disc drive CD-ROM, etc. The removable storage drive may read from and/or written to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a CD-ROM or a DVD; a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, a relational database management system (RDBMS) can be used. In those embodiments, tables in the RDBMS can include columns that represent coordinates. In the case of economic systems, data representing companies, products, etc. can be stored in tables in the RDBMS. The tables can have predefined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an EPROM, or PROM and associated socket), and other removable storage units and interfaces, which may allow software and data to be transferred from the removable storage unit to computer system.

The computing device may also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device may also include output devices, such as but not limited to, a display, and a display interface. The computing device may include input/output (I/O) devices such as but not limited to a communications interface, cable and communications path, etc. These devices may include, but are not limited to, a network interface card, and modems. Communications interface(s) may allow software and data to be transferred between a computer system and one or more external devices.

In one or more embodiments, the computing device may be operatively coupled to an automotive system. Such automotive system may be either manually operated, semi-autonomous, or fully autonomous. In such an embodiment, input and output devices may include one or more image capture devices, controllers, microcontrollers, and/or other processors to control automotive functions such as, but not limited to, acceleration, braking, and steering. Further, communication infrastructure in such embodiments may also include a Controller Area Network (CAN) bus.

In one or more embodiments, the computing device may be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and may be applicable to any application utilizing machine vision.

In one or more embodiments, the present embodiments can be practiced in the environment of a computer network or networks. The network can include a private network, or a public network (for example the Internet, as described below), or a combination of both. The network may include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C #, Python™, Visual Basic™, JavaScript™, PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as the Ruby on Rails™ framework.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. An autonomous vehicle system comprising:
   an autonomous vehicle;
   an interface configured to receive a request associated with the autonomous vehicle system;
   a transmitter on the autonomous vehicle;
   a receiver on the autonomous vehicle;
   a first computer system on the autonomous vehicle, the first computer system comprising:
   one or more first processors; and
   one or more first non-transitory computer readable storage media communicatively coupled to the one or more first processors and storing one or more first instructions that are executable by the one or more first processors, execution of the one or more first instructions causing the one or more first processors to perform acts comprising:
   determining first information based at least in part on the request; and
   transmitting, via the transmitter, the first information to a remote computing system, the remote computing system being configured to store the first information in a first remote database, to determine an action responsive to the request, and to cause the action to be stored in a second remote database; and
   a second computer system on the autonomous vehicle, the second computer system comprising:
   one or more second processors; and
   one or more second non-transitory computer readable storage media communicatively coupled to the one or more second processors and storing one or more second instructions that are executable by the one or more second processors, execution of the one or more second instructions causing the one or more second processors to perform acts comprising:
   querying the second remote database to generate a query response;
   receiving via the receiver, based at least in part on the query response, second information indicative of the action responsive to the request; and
   controlling an aspect of the autonomous vehicle to implement the action based at least in part on the second information.

2. The system of claim 1, wherein the request comprises one of:
   a request received from the autonomous vehicle;
   a request received from an electronic device associated with a user associated with the autonomous vehicle; or
   a request received from a fleet management system associated with the autonomous vehicle.

3. The system of claim 1, wherein the request comprises at least one of:
   a request to change an attribute of an internal environment of the autonomous vehicle;
   a request to navigate the autonomous vehicle in an external environment of the autonomous vehicle;
   a request to interact with the internal environment or with the external environment;
   a request to service the autonomous vehicle; or
   a request to receive information about the autonomous vehicle.

4. The system of claim 1, wherein the second remote database comprises a first queue and a second queue.

5. The system of claim 4, wherein the first queue comprises actions of a first type and the second queue comprises actions of a second type, the query response configured to prioritize actions in the first queue over actions in the second queue based in part on at least one of a latency tolerance for the respective action or a type of system associated with the respective action.

6. The system of claim 1, wherein the first remote database comprises a first queue and a second queue, the first information being placed in the first queue based on the request being associated with a first type of request or in the second queue based on the request being associated with a second type of request.

7. The system of claim 1, wherein the first information comprises verification information, the verification information indicative of a source of the request, and further wherein the source of the request comprises at least one of:
   the autonomous vehicle,
   a first electric device associated with a user;
   a second electronic device associated with the autonomous vehicle, or
   a third electronic device associated with a service entity.

8. The system of claim 7, wherein the querying the second database comprises querying the second database at a predetermined frequency.

9. A method of controlling an autonomous vehicle, the method comprising:
   receiving, at a user interface of the autonomous vehicle, a request associated with the autonomous vehicle;
   sending, from a first computing system of the autonomous vehicle to a remote computing system, first information indicative of the request, the first information being stored at a first remote database associated with the remote computing system, the remote computing system determining an action in response to the request and causing the action to be stored in a second remote database;
   requesting, from the second remote database and using a second computing system of the autonomous vehicle, second information associated with the action; and
   implementing the action at the autonomous vehicle.

10. The method of claim 9, further comprising sending verification information the verification information including an indication of a source of the request and being used by a remote computing device associated with the first remote database to verify the request, and
   further wherein the source of the request comprises at least one of:
   the autonomous vehicle,
   an electric device associated with a user;
   an electronic device associated with the autonomous vehicle, or
   an electronic device associated with a fleet management entity.

11. The method of claim 9, wherein at least one of the first database has an associated first queue and an associated second queue or the second database has an associated third queue and an associated fourth queue, the first information being queued in the first queue or in the second queue based on a type of the request or a priority of the request and the second information being queued in the third queue or the fourth queue based on a type of the action, a priority of the action, or a source of the action.

12. The method of claim 9, wherein:
   the request comprises a request to adjust an attribute of an internal environment of the autonomous vehicle, the internal attribute comprising one of a temperature of the internal environment, a sound output in the internal environment, or a lighting of the internal environment, the action comprises a corresponding instruction to alter an air conditioner or heater of the autonomous vehicle, to adjust speaker outputs in the autonomous vehicle, or to control lights in the autonomous vehicle, and
   implementing the action at the autonomous vehicle comprises controlling the air conditioner or heater to change the temperature, controlling one or more speakers to alter the speaker outputs, or adjusting the lights.

13. The method of claim 9, wherein requesting second information from the second computing system comprises:
   querying the second computing system for the second information to generate a query response; and
   receiving, from the second computing system, the second information based at least in part on the query response.

14. A method of controlling requests, the method comprising:
   accessing, from a first database, first information associated with a request related to an autonomous vehicle, the first request being received from a first computing system of the autonomous vehicle;
   determining a source of the request;
   based at least in part on the source of the request, determining that the request is an authentic request;
   determining an action based at least in part on the request; and
   transmitting second information associated with the request to a second database,
   wherein the second information is configured to be accessed by a second computing system of the autonomous vehicle and the autonomous vehicle implements the action.

15. The method of claim 14, wherein the accessing the first information comprises reading the first information out of a queue associated with the first database.

16. The method of claim 14, wherein the second database comprises a plurality of queues, and the second information is stored in one of the plurality of queues based, at least in part, on a latency tolerance associated with the action or a criticality of the action.

17. The method of claim 14, wherein the first database comprises a first private cloud computing environment and the second database comprises a second private cloud computing environment.

18. The method of claim 14, the request having been generated from at least one of the autonomous vehicle, an electronic device associated with an authorized user of the autonomous vehicle, or a fleet management service associated with the autonomous vehicle.

19. The method of claim 14, further comprising, based at least in part on the first information and the source of the request, determining that the source of the request is authorized to make the request.

20. The method of claim 14, further comprising determining whether the request can be safely carried out, the determining the action being based at least in part on determining that the request can be safely carried out.

* * * * *